United States Patent
Fujiwara et al.

(10) Patent No.: US 8,122,869 B2
(45) Date of Patent: Feb. 28, 2012

(54) AIR-FUEL RATIO CONTROL SYSTEM OF A MULTI-CYLINDER INTERNAL COMBUSTION ENGINE

(75) Inventors: Takahiko Fujiwara, Susono (JP); Norihisa Nakagawa, Numazu (JP); Taiga Hagimoto, Susono (JP); Junichi Kako, Susono (JP); Naoto Kato, Susono (JP); Shuntaro Okazaki, Susono (JP); Koji Ide, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 298 days.

(21) Appl. No.: 12/443,782

(22) PCT Filed: Aug. 13, 2007

(86) PCT No.: PCT/JP2007/066064
§ 371 (c)(1),
(2), (4) Date: Mar. 31, 2009

(87) PCT Pub. No.: WO2008/044390
PCT Pub. Date: Apr. 17, 2008

(65) Prior Publication Data
US 2010/0024790 A1    Feb. 4, 2010

(30) Foreign Application Priority Data
Oct. 12, 2006   (JP) .................................. 2006-278641

(51) Int. Cl.
*F02M 1/00*    (2006.01)

(52) U.S. Cl. .......................... 123/434; 123/674; 123/345

(58) Field of Classification Search .................. 123/434, 123/674, 478, 480, 462, 321, 322, 345–348, 123/90.1, 90.15
See application file for complete search history.

(56) References Cited

U.S. PATENT DOCUMENTS

| | | | |
|---|---|---|---|
| 6,463,912 B1 * | 10/2002 | Fuwa | 123/480 |
| 7,377,273 B2 * | 5/2008 | Miyashita | 123/672 |
| 2002/0104520 A1 | 8/2002 | Nakasaka et al. | |
| 2004/0000135 A1 | 1/2004 | Uchida | |
| 2004/0209734 A1 | 10/2004 | Mitsutani | |
| 2008/0011282 A1 * | 1/2008 | Miyashita | 123/672 |
| 2010/0083935 A1 * | 4/2010 | Murase et al. | 123/406.12 |
| 2010/0108046 A1 * | 5/2010 | Nakagawa et al. | 123/674 |

FOREIGN PATENT DOCUMENTS

| | | |
|---|---|---|
| JP | 08-210158 A | 8/1996 |
| JP | 2001-082190 A | 3/2001 |
| JP | 2004-028029 A | 1/2004 |
| JP | 2004-132314 A | 4/2004 |
| JP | 2004-197630 A | 7/2004 |
| JP | 2004-316523 A | 11/2004 |
| JP | 2005-023874 A | 1/2005 |
| JP | 2005-220925 A | 8/2005 |

* cited by examiner

*Primary Examiner* — John Kwon
(74) *Attorney, Agent, or Firm* — Sughrue Mion, PLLC

(57) ABSTRACT

An air-fuel ratio control system of a multi-cylinder internal combustion engine provided with a throttle valve and opening characteristic control means, which system performs feedback control of an air-fuel ratio based on an output of a sensor detecting an air-fuel ratio of exhaust gas and is capable of performing more accurate air-fuel ratio control, is provided. In the feedback control, the relationship of the output of the sensor and a feedback value is corrected based on a feedback learning correction value learned and determined based on the output of the sensor during the feedback control, and, when newly learning the feedback learning correction value, the intake air amount is controlled by only the throttle valve.

6 Claims, 10 Drawing Sheets

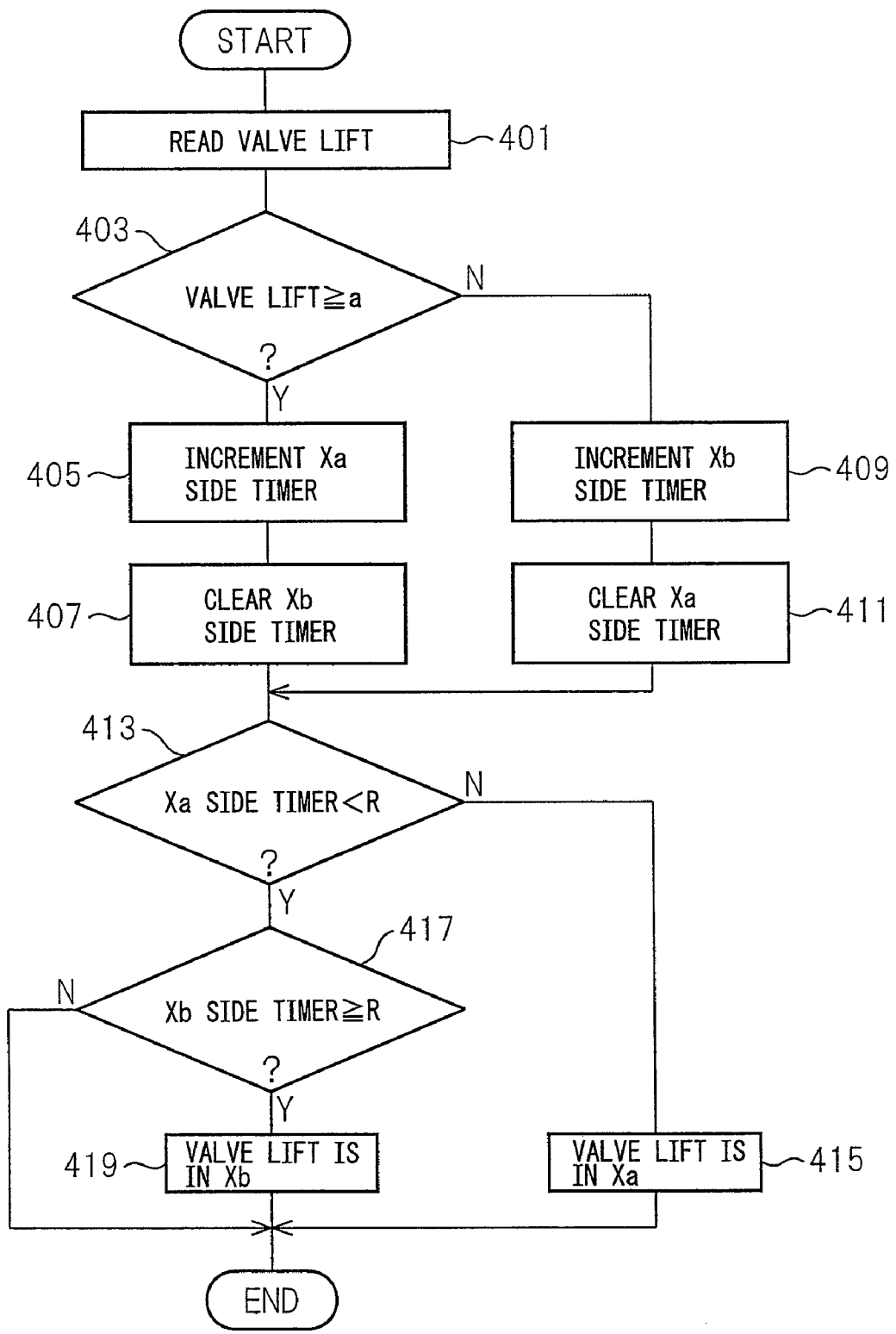

AIR-FUEL RATIO CONTROL SYSTEM OF A MULTI-CYLINDER INTERNAL COMBUSTION ENGINE

TECHNICAL FIELD

The present invention relates to an air-fuel ratio control system of a multi-cylinder internal combustion engine.

BACKGROUND ART

Known in the art is air-fuel ratio feedback control arranging an air-fuel ratio sensor for detecting a value of an air-fuel ratio or an oxygen sensor ($O_2$ sensor) for sensing whether an air-fuel ratio is richer or leaner than a stoichiometric air-fuel ratio based on a residual oxygen concentration in an exhaust passage of an internal combustion engine and controlling a fuel injection amount to control the air-fuel ratio based on that sensor output.

Further, when performing such air-fuel ratio feedback control, there is known a system which provides the air-fuel ratio sensor or oxygen sensor at an upstream side of an exhaust purifying means constituted by a catalyst, provides another oxygen sensor at a downstream side of the catalyst, and, in addition to main feedback control based on the output of the sensor on the upstream side of the catalyst, performs sub feedback control based on the output of the oxygen sensor on the downstream side of the catalyst.

That is, in general, at the downstream side of the catalyst, the exhaust gas is influenced by the oxygen absorption and release reaction of the catalyst, so the output of the downstream side oxygen sensor shows the rich/lean tendency of the entire air-fuel mixture including the oxygen absorption and release reaction of the catalyst. Therefore, by performing the sub feedback control to correct the main feedback value determined in the main feedback control based on the output of the sensor at the upstream side of the catalyst by a sub feedback value determined based on the output of the oxygen sensor at the downstream side of the catalyst so as to determine a final feedback value, it is possible to improve the accuracy of air-fuel ratio control.

Further, in such air-fuel ratio feedback control, there is a system to perform learning control (feedback learning control) changing the relationship between a sensor output and a feedback value so as to perform air-fuel ratio control more accurately and faster while actually performing that air-fuel ratio control. That is, for example, in learning control in the above-mentioned main feedback control or sub feedback control (main feedback learning control and sub feedback learning control), in order for the air-fuel ratio control to be performed more accurately and faster while actually performing the control, the relationship between the output of the sensor at the upstream side of the catalyst and the main feedback value or the relationship between the output of the oxygen sensor at the downstream side of the catalyst and the sub feedback value is corrected.

In this regard, in recent years, internal combustion engines providing not only a throttle valve, but also a device for controlling the working angle, valve lift, or other opening characteristic of an intake valve and/or exhaust valve and controlling the throttle valve opening degree and the opening characteristic so as to control the amount of air sucked into a combustion chamber (hereinafter referred to as the "intake air amount") have been developed and become known. Further, among such internal combustion engines, there are ones able to switch between a state where the intake air amount is controlled by the throttle valve opening degree and a state where the intake air amount is controlled by the opening characteristic of the intake valve (see for example Japanese Patent Publication (A) No. 2005-23874).

On the other hand, in the past, in multi-cylinder internal combustion engines, there has been the problem that assembly error and positioning error of valve parts or wear and deposits of valve parts cause variations in the intake air amount among cylinders and as a result cause variations in air-fuel ratio among the cylinders. Such a problem also occurs in types of multi-cylinder internal combustion engines that control the valve opening characteristics to control the intake air amount in the above way. In particular, the effect is greater the more the opening characteristics are set so that the intake air amount becomes smaller given the same intake pressure, that is, for example, the smaller the working angle or the valve lift of the intake valve.

More specifically, for example, when the same amounts of deposits stick to intake valves, the deviations of the actual intake air amounts from the target intake air amounts become larger in cases where the working angles or valve lifts are made smaller than in cases where the working angles or valve lifts are made larger for the same target intake air amounts. Further, as a result, the effects on variations of the air-fuel ratio among the cylinders also become larger the smaller the working angles or valve lifts.

DISCLOSURE OF THE INVENTION

When performing such air-fuel ratio feedback learning control, if variations occur in the air-fuel ratio among the cylinders due to variations in the intake air amount among the cylinders, accurate learning will not be performed and as a result accurate air-fuel ratio control may not be possible.

The present invention was made taking into account these problems and its object is to provide an air-fuel ratio control system of a multi-cylinder internal combustion engine provided with, as a means for controlling the intake air amount, a throttle valve and a means for controlling an opening characteristic of at least one of an intake valve and an exhaust valve, which air-fuel ratio control system of a multi-cylinder internal combustion engine is an air-fuel ratio control system performing feedback learning control of the air-fuel ratio as explained above and which can perform the air-fuel ratio control more accurately.

The present invention provides, as a means for solving the problems, the air-fuel ratio control systems of multi-cylinder internal combustion engines described in the claims of the claim section.

In a first aspect of the present invention, there is provided an air-fuel ratio control system of a multi-cylinder internal combustion engine provided with, as an intake air amount control means, a throttle valve and an opening characteristic control means for controlling a working angle and/or valve lift of at least one of an intake valve and exhaust valve, which system controls a fuel injection amount based on an output of a sensor detecting an air-fuel ratio of exhaust gas flowing through an exhaust passage and/or a sensor detecting an oxygen concentration of exhaust gas flowing through an exhaust passage so as to perform air-fuel ratio feedback control, the air-fuel ratio control system of a multi-cylinder internal combustion engine characterized in that, in the feedback control, learning control is performed in which a relationship of the output of the sensor and a feedback value is corrected based on a feedback learning correction value learned and determined based on the output of the sensor during the feedback control and, when newly learning and determining the feedback learning correction value, the intake air amount is controlled by only the throttle valve.

When controlling the intake air amount by such an opening characteristic control means, if for example making the working angle or valve lift of the intake valve smaller for intake, the intake air amount will easily vary among the cylinders, so as a result the air-fuel ratio will sometimes end up varying among the cylinders. Further, if variations occur in the air-fuel ratio among the cylinders in such a way, accurate learning cannot be performed in the learning control (that is, it becomes difficult to appropriately determine the feedback learning correction values) and, as a result, there is the possibility that accurate air-fuel ratio control cannot be performed.

With respect to this, in the present aspect, when newly learning and determining the feedback learning correction value, the intake air amount is controlled by only the throttle valve. Further, by doing this, variations in the air-fuel ratio among the cylinders can be suppressed when newly learning and determining the feedback learning correction value, therefore learning can be performed more accurately and quickly in the learning control (that is, the feedback learning correction value can be determined more appropriately and quickly) and, as a result, accurate air-fuel ratio control can be performed quickly.

Note that, in the Claims and Description of this application, "when newly learning and determining the feedback learning correction value" includes not only cases of determining the value from a state where there is no such feedback learning correction value (that is, for example, the case of completely newly learning and determining the feedback learning correction value or the case of learning and determining a feedback learning correction value once more after a feedback learning correction value previously learned, determined, and stored is erased by removing the battery etc.), but also cases of periodically or irregularly updating the feedback learning correction value.

In a second aspect of the present invention, when the intake air amount is controlled by only the throttle valve when newly learning and determining the feedback learning correction value, the working angle and/or valve lift is made a constant value of a predetermined value or more.

As in this aspect, when controlling the intake air amount by only the throttle valve when newly learning and determining the feedback learning correction value, by fixing the working angle and/or valve lift to a relatively large value, variations in the air-fuel ratio among the cylinders when newly learning and determining the feedback learning correction value can be more reliably suppressed. As a result, accurate learning can be more reliably performed in the learning control (that is, the feedback learning correction value can be appropriately determined more reliably) and accurate air-fuel ratio control can be performed more reliably.

In a third aspect of the present invention, after determining the feedback learning correction value for when controlling the intake air amount by only the throttle valve, a feedback learning correction value for when controlling the intake air amount using the opening characteristic control means is learned and determined.

Further, in a fourth aspect of the present invention, the feedback learning correction value for when controlling the intake air amount using the opening characteristic control means is learned and determined for each predetermined control range of the working angle and/or valve lift.

According to the third and fourth aspects, when controlling the intake air amount using the opening characteristic control means, more accurate air-fuel ratio control can be performed.

In a fifth aspect of the present invention, when newly learning and determining the feedback learning correction value for when controlling the intake air amount using the opening characteristic control means, the control range of the working angle and/or valve lift is limited to a control range in the predetermined control range in which the value of the working angle and/or valve lift becomes the largest and the feedback learning correction value corresponding to that control range is first learned and determined.

According to this aspect, when learning and determining the feedback learning correction value for when controlling the intake air amount using the opening characteristic control means, it is possible to quickly and reliably obtain a feedback learning correction value in a control range where the value of the working angle and/or valve lift becomes large, for which correction values error due to variations in the intake air amount among the cylinders (that is, variations in the air-fuel ratio among the cylinders due to that variations in the intake air amount) is small and for which correction values there is little opportunity for learning. Further, by using this feedback learning correction value, more accurate air-fuel ratio control can be performed.

In a sixth aspect of the present invention, there is provided an air-fuel ratio control system of a multi-cylinder internal combustion engine provided with, as an intake air amount control means, a throttle valve and an opening characteristic control means for controlling a working angle and/or valve lift of at least one of an intake valve and exhaust valve, which system controls a fuel injection amount based on an output of a sensor detecting an air-fuel ratio of exhaust gas flowing through an exhaust passage and/or a sensor detecting an oxygen concentration of exhaust gas flowing through an exhaust passage so as to perform air-fuel ratio feedback control, the air-fuel ratio control system of a multi-cylinder internal combustion engine characterized in that, in the feedback control, learning control is performed in which a relationship of the output of the sensor and a feedback value is corrected based on a feedback learning correction value learned and determined based on the output of the sensor during the feedback control, the feedback learning correction value is learned and determined for each predetermined control range of the working angle and/or valve lift, and, when newly learning and determining the feedback learning correction value, the control range of the working angle and/or valve lift is limited to a control range in the predetermined control range in which the value of the working angle and/or valve lift becomes the largest and the feedback learning correction value corresponding to that control range is first learned and determined.

If following this aspect, it is possible to quickly and reliably obtain a feedback learning correction value in a control range where the value of the working angle and/or valve lift becomes large, for which correction values error due to variations in the intake air amount among the cylinders (that is, variations in the air-fuel ratio among the cylinders due to that variations in the intake air amount) is small and for which correction values there is little opportunity for learning. Further, by using this feedback learning correction value, more accurate air-fuel ratio control can be performed.

In a seventh aspect of the present invention, the predetermined control range is set narrower at a side where the working angle and/or valve lift become small values.

The more the control range of the working angle and/or valve lift lies at the side where the working angle and/or valve lift become small values, the greater the effect of a change of the working angle and/or valve lift on the intake air amount and, further, the easier variations in the intake air amount among the cylinders (that is, variations in the air-fuel ratio among the cylinders due to that variations in the intake air amount) occur. Therefore, by designing the system like the seventh aspect, accurate air-fuel ratio control can be performed even when the working angle and/or valve lift is controlled by a relatively small value.

In an eighth aspect of the present invention, there is provided an air-fuel ratio control system of a multi-cylinder internal combustion engine provided with, as an intake air amount control means, a throttle valve and an opening characteristic control means for controlling a working angle and/or valve lift of at least one of an intake valve and exhaust valve, which system controls a fuel injection amount based on an output of a sensor detecting an air-fuel ratio of exhaust gas flowing through an exhaust passage and/or a sensor detecting an oxygen concentration of exhaust gas flowing through an exhaust passage so as to perform air-fuel ratio feedback control, the air-fuel ratio control system of a multi-cylinder internal combustion engine characterized in that, in the feedback control, learning control is performed in which a relationship of the output of the sensor and a feedback value is corrected based on a feedback learning correction value learned and determined based on the output of the sensor during the feedback control, and in that the feedback learning correction value is newly learned and determined only when the working angle and/or valve lift is a predetermined value or more.

Further, in a ninth aspect of the present invention, when newly learning and determining the feedback learning correction value, a control range of the working angle and/or valve lift is limited to a control range in which the value of the working angle and/or valve lift becomes the predetermined value or more.

By designing the system like in the eighth and ninth aspects as well, the working angle and/or valve lift when learning and determining the feedback learning correction value will become relatively large values, so occurrence of variations in the air-fuel ratio among the cylinders when newly learning and determining the feedback learning correction values can be reliably suppressed. As a result, accurate learning can be performed reliably in the learning control (that is, the feedback learning correction value can be appropriately determined more reliably), and accurate air-fuel ratio control can be performed more reliably.

In a 10th aspect of the present invention, an exhaust purifying means is provided in the exhaust passage, a sensor detecting an air-fuel ratio of exhaust gas or a sensor detecting an oxygen concentration of exhaust gas is provided further upstream from the exhaust purifying means as an upstream side sensor, a sensor detecting an air-fuel ratio of exhaust gas or a sensor detecting an oxygen concentration of exhaust gas is provided further downstream from the exhaust purifying means as a downstream side sensor, and the feedback control includes at least one of a main feedback control performed based on an output of the upstream side sensor and a sub feedback control performed based on an output of the downstream side sensor.

In this aspect, when the feedback control includes the main feedback control, learning control is performed in which a relationship of the output of the upstream side sensor and a main feedback value is corrected based on a main feedback learning correction value learned and determined based on the output of the upstream side sensor during the feedback control, and, when learning and determining the main feedback learning correction value, any of the above-mentioned first to ninth aspects is followed. Further, when the feedback control includes the sub feedback control, learning control is performed in which a relationship of the output of the downstream side sensor and a sub feedback value is corrected based on a sub feedback learning correction value learned and determined based on the output of the downstream side sensor during the feedback control, and when learning and determining the sub feedback learning correction value, any of the above-mentioned first to ninth aspects is followed. Therefore, by designing the system as in the 10th aspect, in the same way as the first to ninth aspects, more accurate air-fuel ratio control can be performed.

Note that, of course, the 10th aspect includes the case where the learning control is performed in both the main feedback control and the sub feedback control. In that case, any of the first to ninth aspects may be followed when learning and determining the learning correction value in only one learning control of the main feedback control or the sub feedback control.

Below, the present invention will be further sufficiently understood from the attached drawings and descriptions of the preferred embodiments of the present invention.

BRIEF DESCRIPTION OF THE DRAWINGS

FIG. 11 is a flow chart for explaining control performed for judging the control range of the valve lift.

BEST MODE FOR CARRYING OUT THE INVENTION

Figure 1:
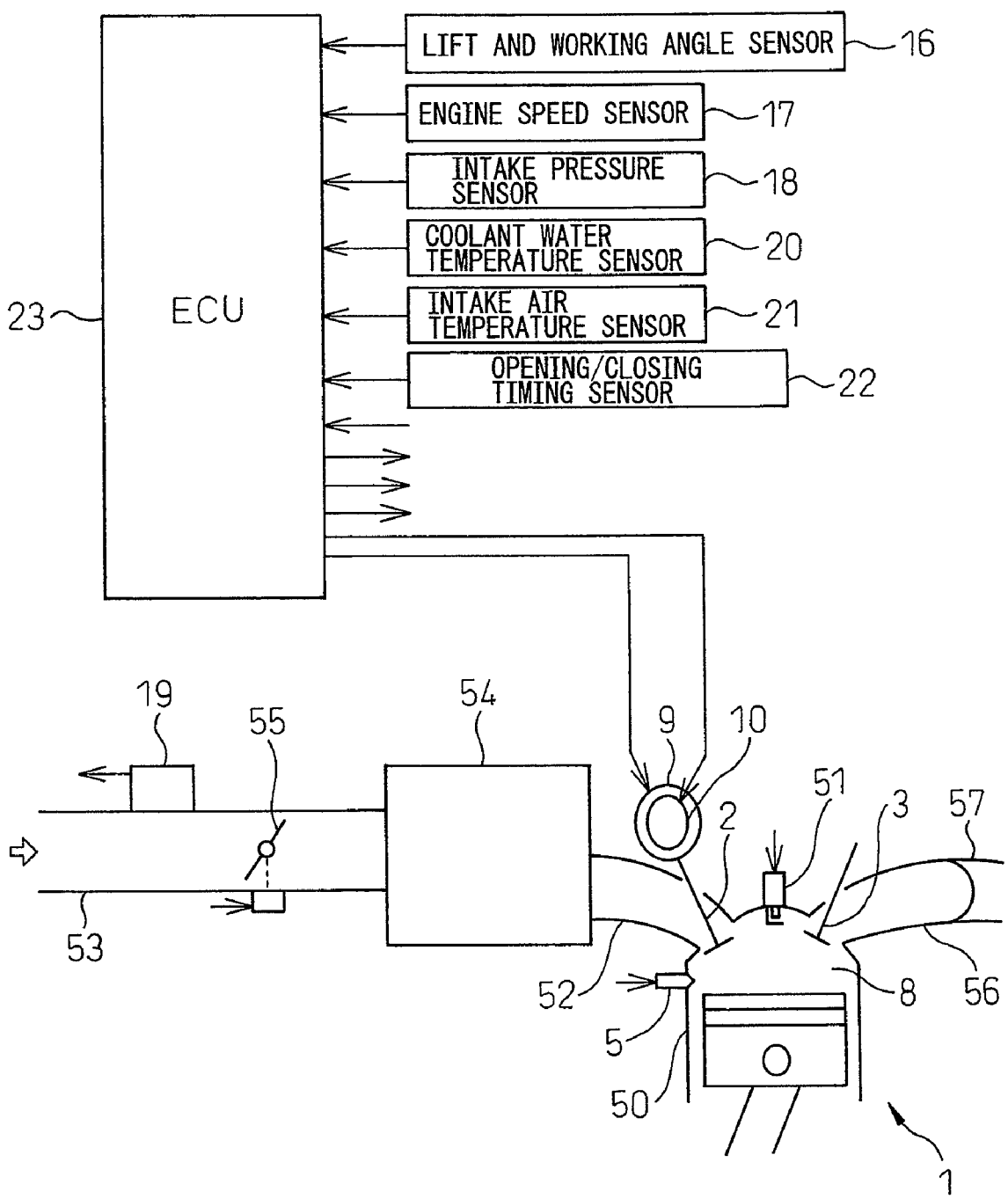
FIG. 1 is a schematic view of the configuration of a multi-cylinder internal combustion engine using an air-fuel ratio control system of one embodiment of the present invention.

Hereinafter, referring to the drawings, embodiments of the present invention will be explained in detail. Note that, in the drawings, the same or similar structural elements are given common reference numerals.

Figure 2:
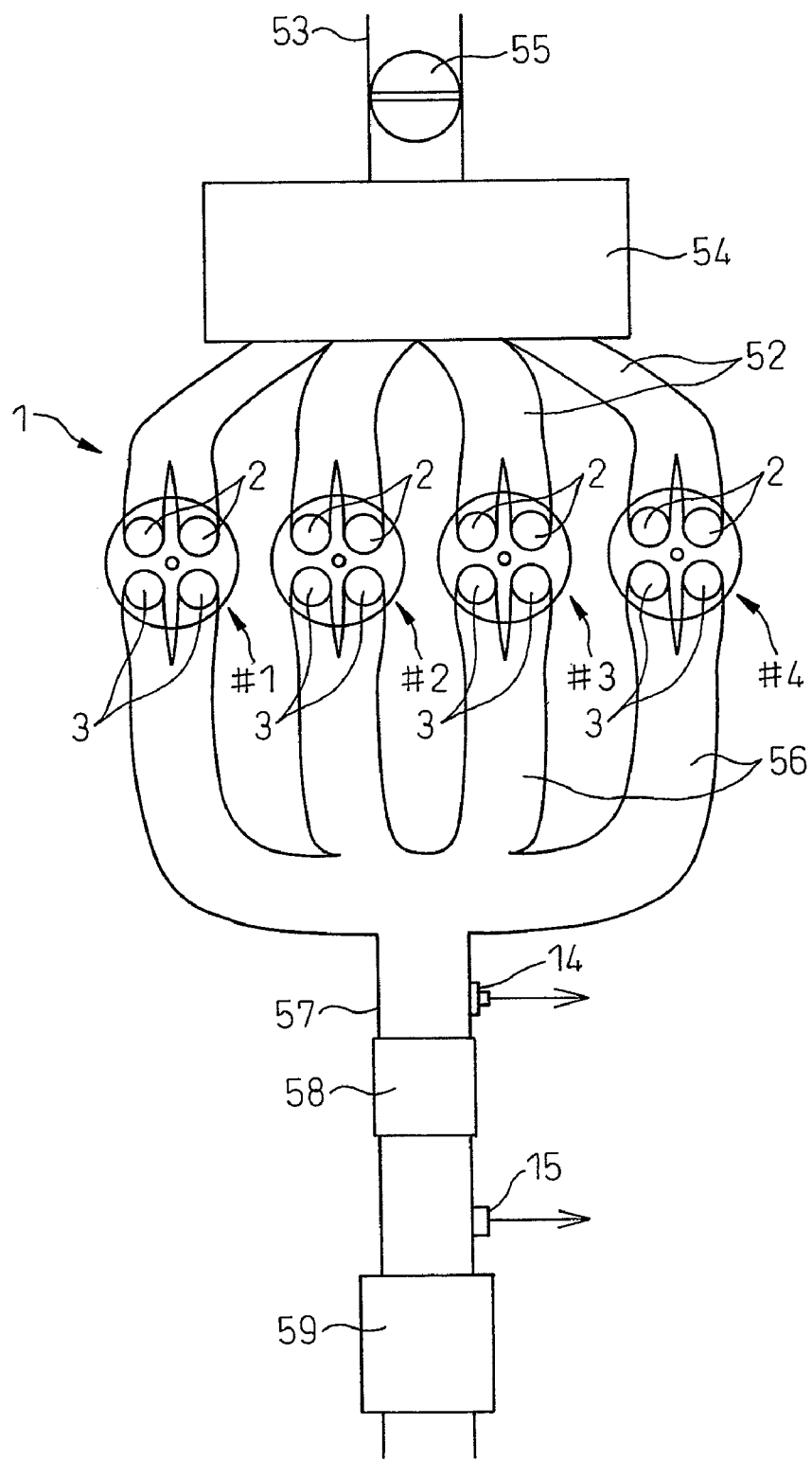
FIG. 2 is a plan view of an intake system and exhaust system etc. of the multi-cylinder internal combustion engine shown in FIG. 1.

FIG. 1 is a schematic view of the configuration of a multi-cylinder internal combustion engine using an air-fuel ratio control system of an embodiment of the present invention, while FIG. 2 is a plan view of an intake system and an exhaust system etc. of the multi-cylinder internal combustion engine shown in FIG. 1. In FIG. 1 and FIG. 2, 1 indicates an internal combustion engine body, 2 indicates an intake valve, and 3 indicates an exhaust valve. As clear from FIG. 2, the internal combustion engine of the present embodiment is a four-cylinder internal combustion engine, and #1 to #4 of FIG. 2 respectively indicate a cylinder #1 to cylinder #4.

In FIG. 1, 5 indicates a fuel injector, 8 indicates a combustion chamber formed inside a cylinder, and 9 indicates a valve lift changer for changing the valve lift. That is, by operating the valve lift changer 9, the valve lift of the intake valve 2 can be controlled. In the present embodiment, when the valve lift of the intake valve 2 is changed by the valve lift changer 9, the opening area of the intake valve 2 will be changed along with it. In the intake valve 2 of the present embodiment, the opening area of the intake valve 2 is increased in accordance with the increase of the valve lift. Further, as will be explained later, in the present embodiment, when the valve lift changer 9 changes the valve lift of the intake valve 2, the working angle of the intake valve 2 is changed along with this.

Further, 10 is a opening/closing timing changer for changing the opening/closing timing without changing the valve lift and working angle of the intake valve 2. That is, in the present embodiment, by operating the opening/closing timing changer 10, it is possible to shift the opening/closing timing of the intake valve 2 to the advance side or shift it to the retarded side and thereby possible to adjust of the valve overlap etc. 50 indicates a cylinder, 51 indicates a spark plug, 52 indicates a downstream side intake pipe which forms branched intake passages to the cylinders, 53 indicates an upstream side intake pipe, 54 indicates a surge tank, and 55 indicates a throttle valve. Further, 56 is an upstream side exhaust pipe which forms branched exhaust passage from the cylinders, and 57 is a downstream side exhaust pipe. Further, as shown in FIG. 2, two catalysts for purifying the exhaust gas are arranged in series in the exhaust passage comprised by the downstream side exhaust pipe 57. These catalysts, that is, an upstream side catalyst 58 and a downstream side catalyst 59, constitute exhaust purifying means, respectively. That is, in the present embodiment, two exhaust purifying means are arranged in the exhaust passage.

Further, an air-fuel ratio sensor detecting a value of an air-fuel ratio in the exhaust gas is provided as an upstream side sensor 14 at the upstream side of the upstream side catalyst 58 of the exhaust passage. Further, an oxygen sensor detecting the oxygen concentration of the exhaust gas and detecting whether the air-fuel ratio is richer or leaner than a stoichiometric air-fuel ratio is provided as a downstream side sensor 15 at the downstream side of the upstream side catalyst 58 of the exhaust passage (more specifically, between the upstream side catalyst 58 and downstream side catalyst 59).

Note that, in the present embodiment, an air-fuel ratio sensor is employed as the upstream side sensor 14, however, in another embodiment, an oxygen sensor such as the one used as the downstream side sensor 15 may also be employed. Further, in the present embodiment, an oxygen sensor is employed as the downstream side sensor 15, however, in another embodiment, an air-fuel ratio sensor such as the one used as the upstream side sensor 14 may be employed. Further, in the present embodiment, the downstream side sensor 15 is arranged between the upstream side catalyst 58 and the downstream side catalyst 59, however, in another embodiment, it may be arranged at the downstream side of the downstream side catalyst 59 of the exhaust passage.

Further, as mentioned above, in the present embodiment, two exhaust purifying means (the upstream side catalyst 58 and the downstream side catalyst 59) are provided in the exhaust passage, however, in another embodiment, only one exhaust purifying means is provided in the exhaust passage and an upstream side sensor and a downstream side sensor may be respectively provided at the upstream side and the downstream side of the exhaust purifying means. Alternatively, three or more exhaust purifying means may be provided. In this case, the downstream side sensor is provided further downstream than at least one of the exhaust purifying means.

Further in FIG. 1, 16 indicates a sensor for detecting a valve lift and working angle of the intake valve 2, and 17 indicates a sensor for detecting the engine speed. 18 indicates an intake pressure sensor for detecting an intake pressure, 19 indicates an airflow meter, 20 indicates a coolant water temperature sensor for detecting a temperature of the internal combustion engine coolant water, 21 indicates an intake air temperature sensor for detecting an intake air temperature, 22 indicates an opening/closing timing sensor for detecting an opening/closing timing of the intake valve 2, and 23 indicates an electronic control unit (ECU).

The ECU 23 comprises a known type of digital computer and is designed to receive signals from the various types of sensors and to send signals to actuating devices, which sensors and devices are provided for controlling the internal combustion engine, so as to perform the necessary control for the operation of the internal combustion engine. That is, for example, in the present embodiment, each fuel injector 5 is connected to the ECU 23, so the injected fuel amount and injection timing can be controlled by signals from the ECU 23. Similarly, the spark plug 51 is also connected to the ECU 23, and the ignition timing can be controlled by a signal from the ECU 23. Further, the opening degree of the throttle valve 55 can be changed without relation to the depression of an acceleration pedal, and the intake pressure can be controlled by adjusting the throttle valve opening degree.

Figure 3:
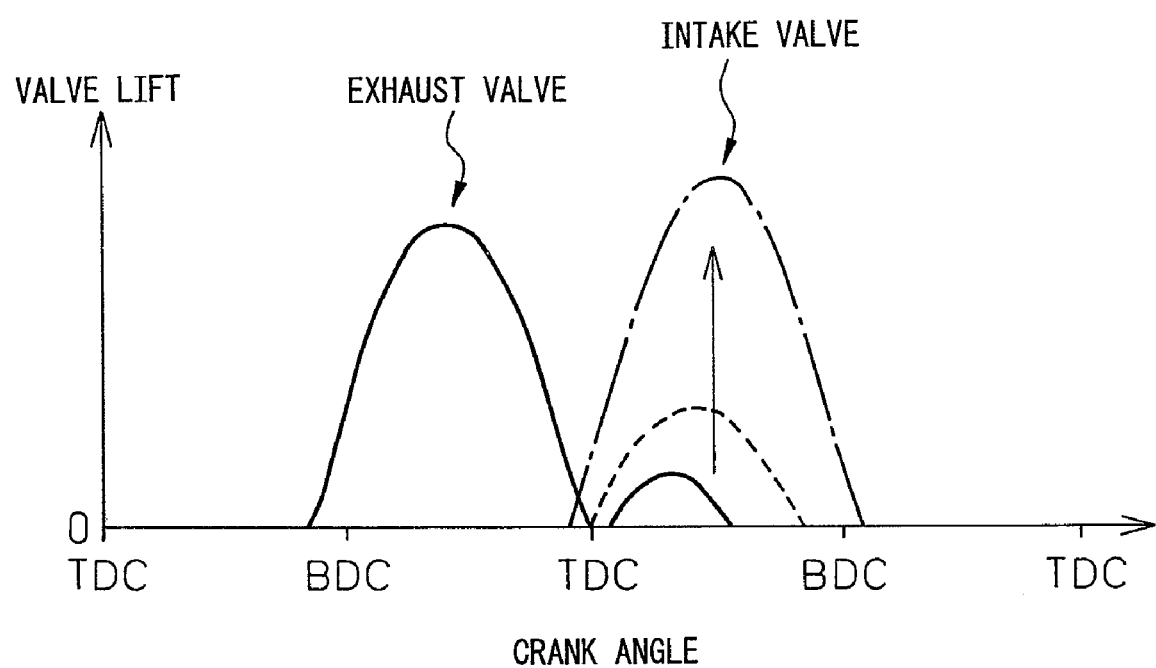
FIG. 3 is a view showing the state in which a valve lift of an intake valve changes along with the operation of a valve lift changer.

FIG. 3 is a view showing the state in which a valve lift of the intake valve 2 changes along with the operation of the valve lift changer 9. As shown in FIG. 3, the valve lift changer 9 continuously changes the valve lift of the intake valve 2. Further in the present embodiment, along with the operation of the valve lift changer 9, the opening period of the intake valve 2 is also changed. That is, the working angle of the intake valve 2 is also changed. Specifically, along with the increase of the valve lift of the intake valve 2, the working angle of the intake valve 2 is increased (solid line→broken line→dotted line). Accordingly, the valve lift changer 9 can control the valve lift and the working angle. In the present embodiment, the valve lift changer 9 comprises the opening characteristic control means.

Further, in the present embodiment, along with the operation of the valve lift changer 9, the timing at which the valve lift of the intake valve 2 peaks is also changed. In further detail, along with the increase of the valve lift of the intake valve 2, the timing at which the valve lift of the intake valve 2 peaks is retarded (solid line→broken line→dotted line).

In the above way, in the present embodiment, the intake pressure can be controlled by the throttle valve 55, and the opening characteristics of the intake valve 2 can be controlled by the opening characteristic control means constituted by the valve lift changer 9. Further, normally, the amount of air sucked into a combustion chamber 8, that is the intake air amount, is controlled by coordinated control of the throttle valve 55 and valve lift changer 9. That is, in the present embodiment, the multi-cylinder internal combustion engine is provided with, as an intake air amount control means, the throttle valve 55 and the valve lift changer 9. Note that, in the present embodiment, it is possible to control the intake air amount by just one of the throttle valve 55 and the valve lift changer 9.

Further, in the present embodiment, the above-mentioned upstream side sensor 14 and downstream side sensor 15 are connected to the ECU 23. Based on the outputs of these sensors, feedback control determining the fuel injection amount etc. and controlling the air-fuel ratio to a target air-fuel ratio is performed. More specifically, in the present embodiment, in addition to a main feedback control based on the output of the upstream side sensor 14, a sub feedback control based on the output of the downstream side sensor 15 is performed. In other words, in the present embodiment, air-fuel ratio control based on the output of the upstream side sensor 14 is corrected based on the output of the downstream side sensor 15.

Further, in the present embodiment, in each such the feedback control, learning control (feedback learning control) is performed in which the relationship between the output of the sensor and the feedback value is changed so that more accurate and faster air-fuel ratio control can be performed during the feedback control. More specifically, in the present embodiment, the relationship between the output of the sensor and the feedback value is corrected based on a feedback learning correction value learned and determined based on the output of the sensor during feedback control.

That is, when the feedback control is performed, normally, the relationship between the sensor output and the feedback value is determined and stored in advance as a basic relationship (base relationship) and feedback control is started using this base relationship. The feedback learning correction value is a value for correcting this base relationship or for correcting the feedback value found from this base relationship.

Further, this feedback learning correction value is learned by starting feedback control using the base relationship and gradually making the feedback learning correction value converge to an appropriate value based on the sensor output during the feedback control. That is, while changing the feedback learning correction value based on the sensor output, the feedback learning correction value is used to correct the relationship between the sensor output and the feedback value or the feedback value so as to find a feedback learning correction value enabling more accurate and faster air-fuel ratio control. Further, when the feedback learning correction value is learned and determined in such a way, this value is stored and used in later feedback control.

In the present embodiment, for the main feedback control, the main feedback learning correction value is learned and determined based on the output of the upstream side sensor 14. Further, afterward, based on the main feedback learning correction value, the base relationship between the output of the upstream side sensor 14 and the main feedback value determined and stored in the ECU 23 in advance, or the main feedback value found from that base relationship, is corrected (that is, the relationship between the output of the upstream side sensor 14 and the main feedback value is changed) to perform the main feedback control. That is, main feedback learning control is performed.

Further, in the present embodiment, for the sub feedback control, the sub feedback learning correction value is learned and determined based on the output of the downstream side sensor 15. Further, afterward, based on the sub feedback learning correction value, the base relationship between the output of the downstream side sensor 15 and the main feedback value determined and stored in the ECU 23 in advance, or a sub feedback value found from that base relationship, is corrected (that is, the relationship between the output of the downstream side sensor 15 and the sub feedback value is changed) to perform the sub feedback control. That is, sub feedback learning control is performed.

However, generally, in a multi-cylinder internal combustion engine, there has been the problem that assembly error and positioning error of valve parts or wear and deposits of valve parts cause variations in the intake air amount among cylinders and as a result cause variations in air-fuel ratio among the cylinders. Such a problem also occurs in types of multi-cylinder internal combustion engines that control the valve opening characteristics to control the intake air amount as in the present embodiment. In particular, the effect is greater the more the opening characteristics are set so that the intake air amount becomes smaller given the same intake pressure, that is, for example, the smaller the working angle or the valve lift of the intake valve 2.

More specifically, for example, when the same amount of deposit sticks to an intake valve 2, the deviation of the actual intake air amount from the target intake air amount becomes larger in cases where the working angle or valve lift is made smaller than in case where the working angle or valve lift is made larger for the same target intake air amount. Further, as a result, the effects on variations of the air-fuel ratio among the cylinders also become larger the smaller the working angle or valve lift.

Further, in cases when performing feedback learning control of the air-fuel ratio such as in the present embodiment, if variations in the air-fuel ratio among the cylinders occur due to such variations in the intake air amount among the cylinders, accurate learning of the feedback learning correction value is not performed and as a result the possibility arises that accurate air-fuel ratio control cannot be performed.

Here, the present embodiment takes this point into consideration and performs control as explained below, for learning and determining the feedback learning correction value, so as to enable more accurate air-fuel ratio control to be performed when performing feedback learning control of the air-fuel ratio in a multi-cylinder internal combustion engine provided with, as a means for controlling the intake air amount, a throttle valve and a means of controlling the opening characteristics of at least one of an intake valve and exhaust valve.

Note that, in the following explanation, the explanation uses the valve lift as the opening characteristic, however, the working angle can also similarly be used. Further, in the present embodiment, the control explained below is performed for both the main feedback learning control and the sub feedback learning control. Therefore, here, the main feedback learning control and the sub feedback learning control are collectively called the "feedback learning control" and the main feedback learning correction value and the sub feedback learning correction value are collectively called the "feedback learning correction value". Note that, in another embodiment, the control explained below may also be performed for just one of the main feedback learning control and the sub feedback learning control.

Figure 4:
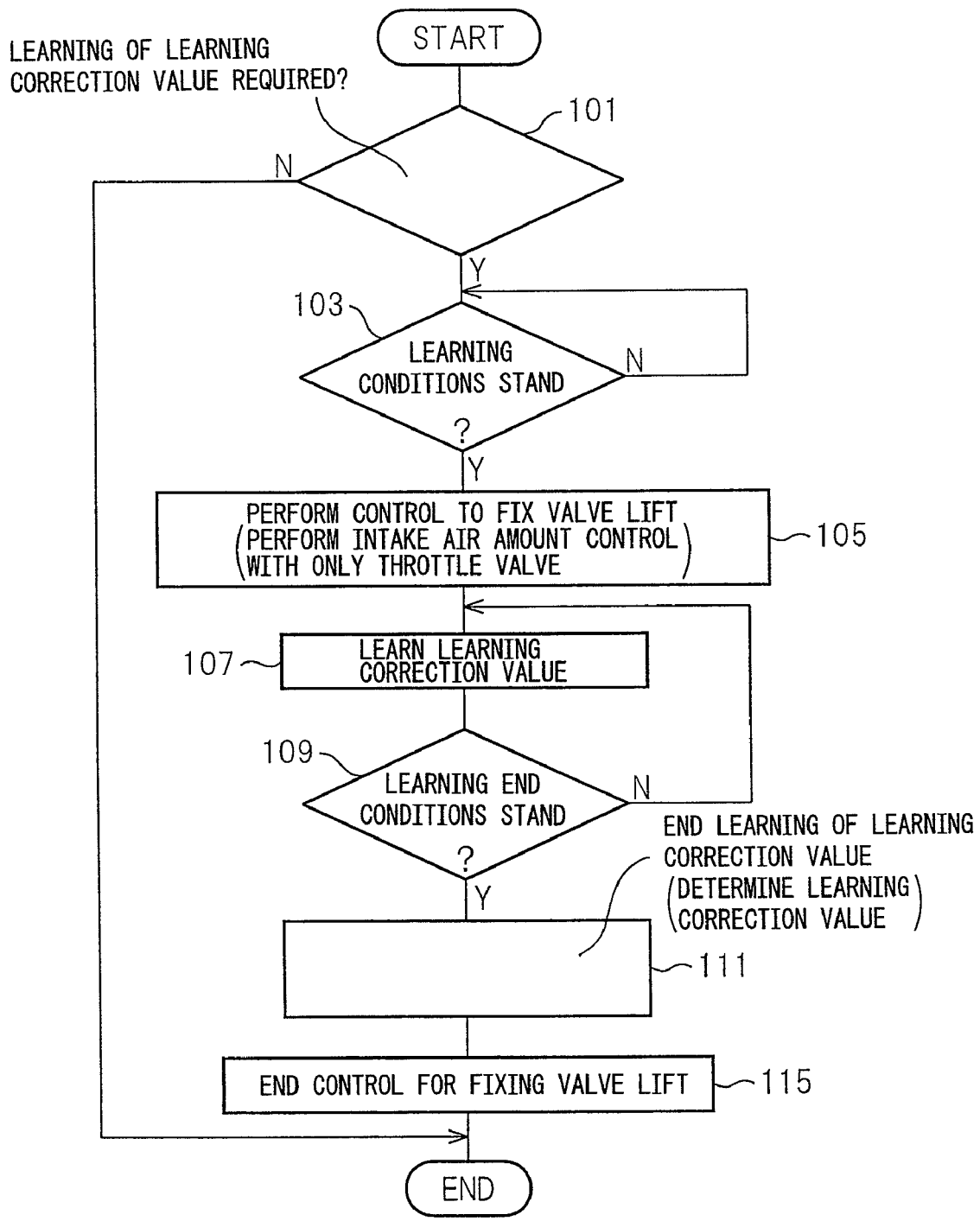
FIG. 4 is a flow chart for explaining control performed in relation to learning and determination of a feedback learning correction value in an embodiment of the present invention.

FIG. 4 is a flow chart explaining the control performed for the learning and determination of the feedback learning correction value in the present embodiment. When the control routine shown in this flow chart is started, first, at step 101, it is judged whether learning of the feedback learning correction value is necessary. In the present embodiment, learning of the feedback learning correction value is performed when the feedback learning correction value is not stored in the ECU 23. Here it is judged whether the feedback learning correction value is stored in the ECU 23. In cases when initially operating the internal combustion engine or in cases when the feedback learning correction value that had previously been learned and determined is erased by removing the battery etc., the feedback learning correction value is not stored in the ECU 23.

Note that, in another embodiment, the feedback learning correction value may be periodically or irregularly updated. In that case, it is judged whether the update timing has arrived. Further, when a plurality of feedback learning correction values are used (for example, cases when the operating region is divided in accordance with the intake air amount etc. and feedback learning correction values differing for each operating region are used), it is judged whether all feedback learning correction values are stored in the ECU 23 and learning correction values that are not stored (that is, require learning) are identified.

When it is judged at step 101 that learning of the feedback learning correction value is unnecessary, the control routine ends. When it is judged that learning of the feedback learning correction value is necessary, the routine proceeds to step 103. Further, at step 103, it is judged whether the conditions for performing learning of the feedback learning correction value stand.

The judgment here is more specifically judgment of whether, for example, the internal combustion engine body and the catalyst have finished being warmed up etc. Further, when a plurality of feedback learning correction values are used, it is judged whether the learning conditions corresponding to the feedback learning correction value to be learned stand. That is, when, for example, feedback learning correction values differing for each operating region are used, it is judged whether the operating state at that time is in the operating region corresponding to the feedback learning correction value to be learned.

When it is judged at step 103 that the learning conditions of the feedback learning correction value do not stand, the control at step 103 is repeated. That is, in this case, the routine waits until the learning conditions of the feedback learning correction value stand. On the other hand, when it is judged at step 103 that the learning conditions of the feedback learning correction value stand, the routine proceeds to step 105 where control to fix the valve lift is performed. That is, control of the valve lift by the valve lift changer 9 is halted and the intake air amount is controlled by only the throttle valve 55.

Further, in the present embodiment, at this time, the valve lift is made a constant value of a predetermined value or more. This is to fix the valve lift at a relatively large value. The predetermined value is determined in advance taking into account, for example, the effect on the intake air amount caused by the difference in the valve lift (that is, for example, the value is determined so that the effect on the intake air amount due to difference in the valve lift is made a sufficiently small). Further, in another embodiment, the predetermined value may be an intermediate value in the control range of the valve lift, and the constant value may be a maximum value of the valve lift.

When control to fix the valve lift is started at step 105, the routine proceeds to step 107. At step 107, learning of the feedback learning correction value is performed. That is, feedback control of the air-fuel ratio is performed and control is performed based on the sensor output during that feedback control so as to make the feedback learning correction value gradually converge to an appropriate value.

Further, at step 109, it is judged whether the conditions for ending learning of the feedback learning correction value stand. The judgment here is judgment as to whether the feedback learning correction value being sought has sufficiently converged. Further, when it is judged at step 109 that the learning end conditions of the feedback learning correction value do not stand, the routine returns to step 107 where learning of the feedback learning correction value is continued. On the other hand, when it is judged at step 109 that the learning end conditions of the feedback learning correction value stand, the routine proceeds to step 111 where the learning of the feedback learning correction value is ended (that is, the feedback learning correction value is determined).

When the learning of the feedback learning correction value is ended at step 111, the routine proceeds to step 115. Then, at step 115, the control for fixing the valve lift is ended, the system is set in a state where intake air amount control is possible using the valve lift control by the valve lift changer 9, and the control routine is ended.

In the above way, in the present embodiment, when newly learning and determining the feedback learning correction value, the intake air amount is controlled by only the throttle valve 55. Further, by doing so, when newly learning and determining the feedback learning correction value, because variations in the air-fuel ratio among the cylinders are suppressed, more accurate learning can be performed quickly (that is, the feedback learning correction value can be determined more appropriately and quickly) and as a result it is possible to perform more accurate air-fuel ratio control quickly.

Further, in the present embodiment, when controlling the intake air amount by only the throttle valve 55 when newly learning and determining the feedback learning correction value, the valve lift is made a constant value of a predetermined value or more taking into consideration the effects on the intake air amount from the difference in the valve lift. In this way, when controlling the intake air amount by only the throttle valve 55 when newly learning and determining the feedback learning correction value, by having the valve lift fixed to a relatively large value, it is possible to more reliably suppress variations in the air-fuel ratio among the cylinders when newly learning and determining the feedback learning correction value. As a result, accurate learning in the feedback learning control can be performed more reliably (that is, the feedback learning correction value can be accurately determined more reliably) and accurate air-fuel ratio control can be performed more reliably.

Note that, while clear from the explanation up until now, the control routine shown in the flow chart of FIG. 4 is repeatedly performed at, for example, constant intervals when using a plurality of feedback learning correction values. On the other hand, when using a plurality of feedback learning correction values, control such as the control routine shown in the flow chart of FIG. 5 may be performed.

Figure 5:
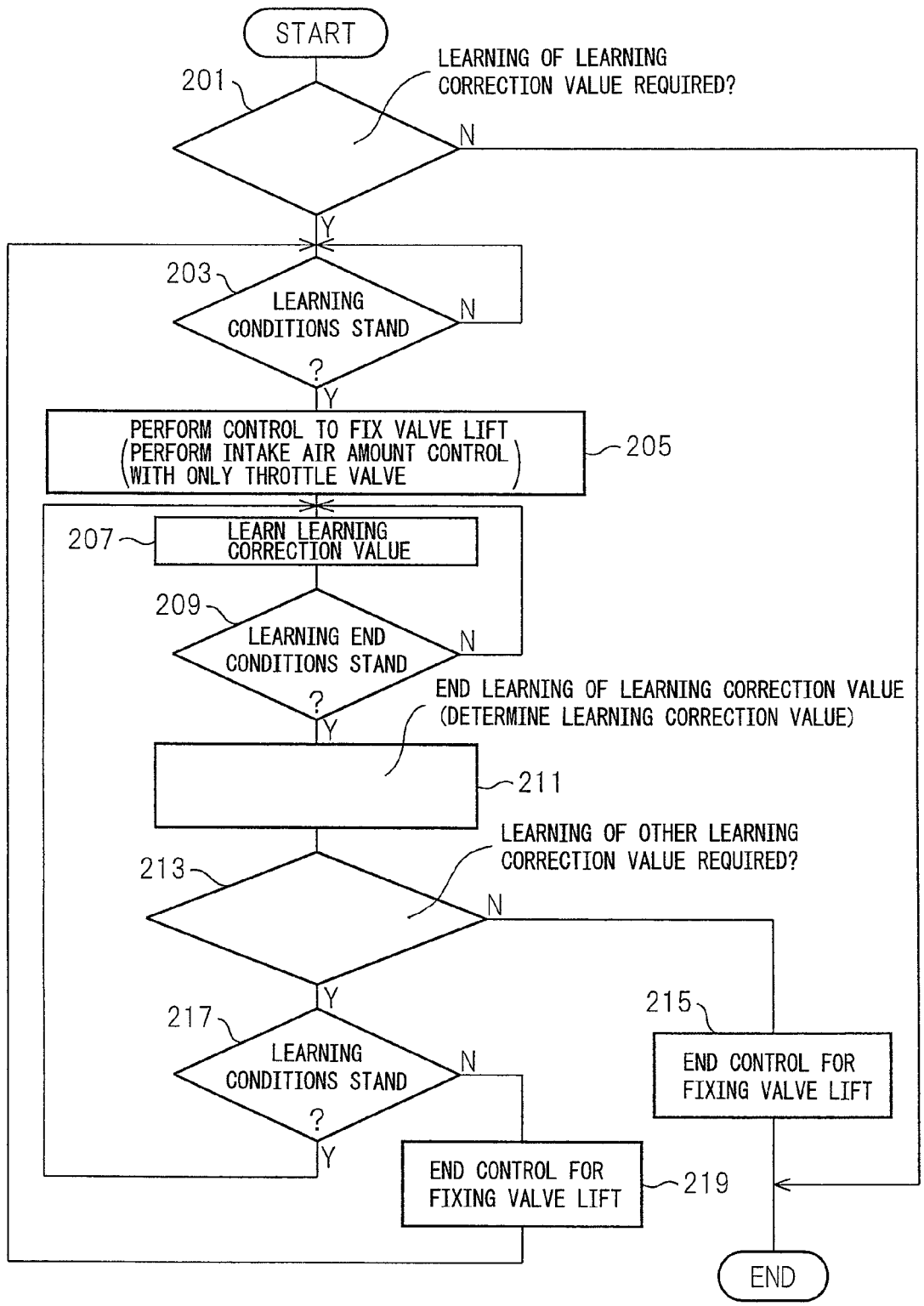
FIG. 5 is a flow chart for explaining control performed in relation to learning and determination of a feedback learning correction value in another embodiment of the present invention.

Here, referring to FIG. 5, the controls at steps 201, 203, 205, 207, 209, and 211 among the controls in the steps of the control routine of FIG. 5 respectively correspond to the controls at steps 101, 103, 105, 107, 109, and 111 of the control routine of FIG. 4. Further, in the control routine of FIG. 5, at step 211, when learning of the feedback learning correction value is ended, the routine proceeds to step 213. Further, at step 213, it is judged whether learning of other feedback learning correction values is necessary. Here, the control is basically the same as the control at step 101 of the control routine of FIG. 4.

Further, when it is judged at step 213 that learning of other feedback learning correction values is not necessary, the routine proceeds to step 215, where the control for fixing the valve lift is ended, the system is set at a state where intake air amount control is possible using the valve lift control by the valve lift changer 9, and the routine is ended. The control at this step 215 is basically the same as the control at step 115 of the control routine of FIG. 4.

On the other hand, when it is judged at step 213 that learning of other feedback learning correction values is necessary, the routine proceeds to step 217. At step 217, it is judged whether the conditions for learning the feedback learning correction value requiring learning in step 213 stand. The control at this step 217 is basically the same as the control at step 103 of the control routine of FIG. 4.

Further, when it is judged at step 217 that the conditions for learning the feedback learning correction value requiring learning at step 213 stand, the routine proceeds to step 207, where learning of the feedback learning correction value is performed. That is, in this case, while the control for fixing the valve lift continues, learning of the feedback learning correction value is started.

On the other hand, when it is judged at step 217 that the conditions for learning the feedback learning correction value requiring learning at step 213 do not stand, the routine proceeds to step 219, where the fixed valve lift control ends, that is, the system is set at a state where intake air amount control is possible using the valve lift control by the valve lift changer 9, and the routine proceeds to step 203. That is, in this case, the control for fixing the valve lift ends once, the system is set at a state where intake air amount control is possible using the valve lift control by the valve lift changer 9, and the routine waits until the learning conditions for the next feedback learning correction value stand. Note that, the control at this step 219 is the same as the control at step 215 and step 115 of the control routine of FIG. 4.

Next, still another embodiment of the present invention will be explained. This embodiment can also be worked in the configuration shown in FIG. 1 and FIG. 2 and includes many parts common to the above embodiments. The explanation of these common parts is omitted in principle.

In this embodiment, after determining the feedback learning correction value for when controlling the intake air amount by only the throttle valve 55, the feedback learning correction value for the case of controlling the intake air amount using the opening characteristic control means constituted by the valve lift changer 9 (that is, the variable valve lift feedback learning correction value) is learned and determined. Note here that the case of controlling the intake air amount using the opening characteristic control means constituted by the valve lift changer 9 includes the case of controlling the intake air amount using only the valve lift changer 9 and also the case of controlling the intake air amount by coordinated control of the throttle valve 55 and the valve lift changer 9.

Figure 6:
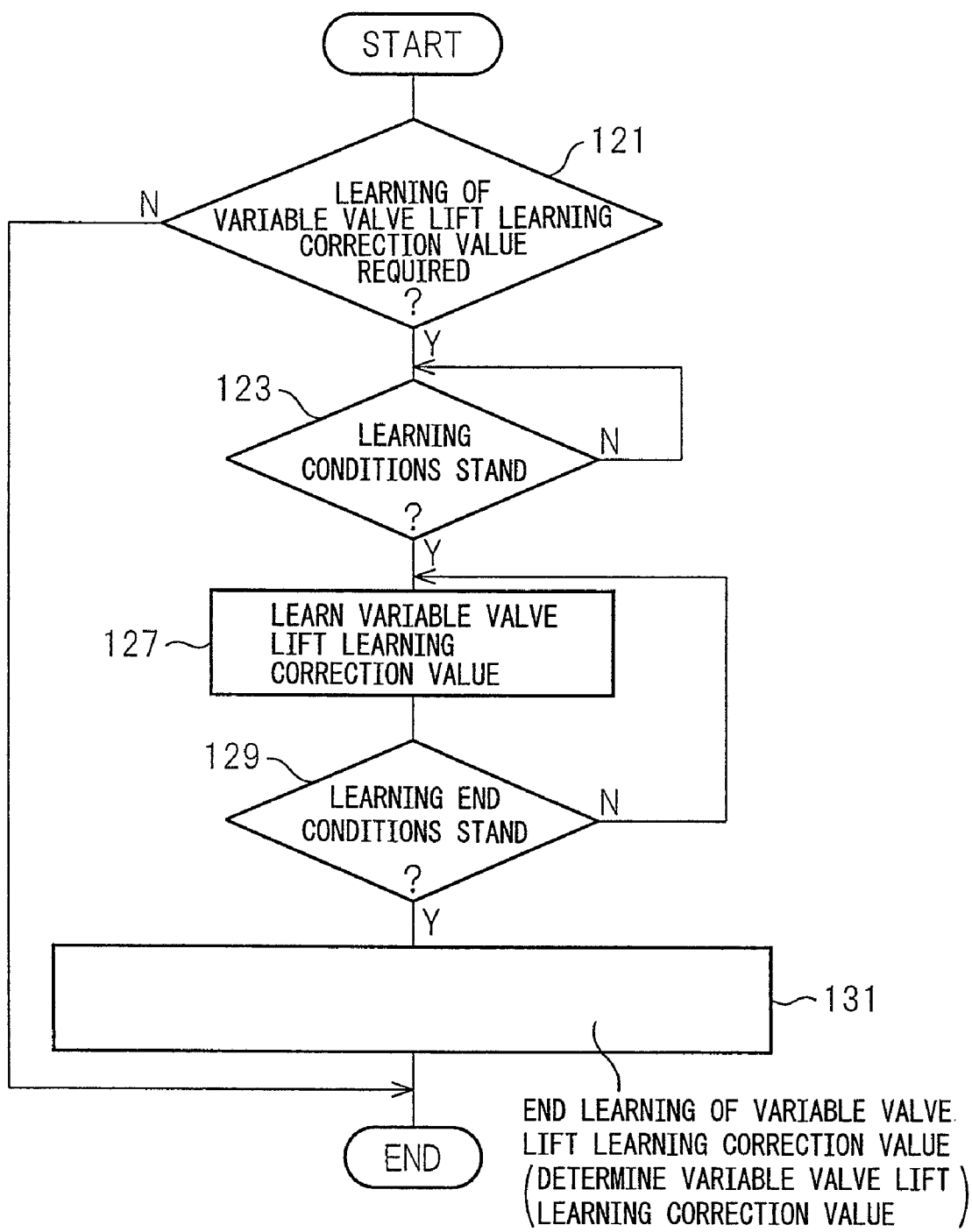
FIG. 6 is a flow chart for explaining control performed in relation to learning and determination of a feedback learning correction value in still another embodiment of the present invention.

More specifically, in this embodiment, after the control routine shown in the flow chart of FIG. 4 is performed and the feedback learning correction value for when controlling the intake air amount by only the throttle valve 55 is determined, the control of the control routine shown in the flow chart of FIG. 6 is performed and thereby the feedback learning correction value for the case of controlling the intake air amount using the opening characteristic control means constituted by valve lift changer 9 is learned and determined. Note that the control of the control routine shown in the flow chart of FIG. 4 was explained earlier, so the control of the control routine shown in the flow chart of FIG. 6 will be explained below.

When the control routine shown in the flow chart of FIG. 6 is started, first, at step 121, it is judged whether learning of the variable valve lift feedback learning correction value is necessary. The control at this step 121 is basically the same as the control at step 101 of the control routine in FIG. 4. In the present embodiment, it is judged whether the variable valve lift feedback learning correction value is stored in the ECU 23.

Note that, in another embodiment, the variable valve lift feedback learning correction value may be updated periodically or irregularly. In that case, it is judged whether the update timing has arrived. Further, when using a plurality of variable valve lift feedback learning correction values (for example, cases when the operating region is divided in accordance with the control range of the valve lift etc. and variable valve lift feedback learning correction values differing from a control range of the valve lift to a control range of the valve lift are used), it is judged whether all variable valve lift feedback learning correction values are stored in the ECU 23, and any learning correction values not stored (that is, requiring learning) are identified.

When it is judged at step 121 that learning of the variable valve lift feedback learning correction value is not necessary, the control routine ends, while when it is judged that learning of the variable valve lift feedback learning correction value is necessary, the routine proceeds to step 123. Further, at step 123, it is judged whether the conditions for performing learning of the variable valve lift feedback learning correction value stand.

The control at this step 123 is basically the same as the control at step 103 of the control routine in FIG. 4. When a plurality of variable valve lift feedback learning correction values are used, it is judged whether the learning conditions corresponding to the variable valve lift feedback learning correction values to be learned stand. That is, when, for example, variable valve lift feedback learning correction values differing from a control range of the valve lift to a control range of the valve lift are used, it is judged whether the operating state at that time (control range of the valve lift) is in the control range of the valve lift corresponding to the variable valve lift feedback learning correction value to be learned.

When it is judged at step 123 that the learning conditions of the variable valve lift feedback learning correction value do not stand, the control at step 123 is repeated. That is, in this case, the routine waits until the learning conditions of the variable valve lift feedback learning correction value stand.

On the other hand, when it is judged at step 123 that the learning conditions of the variable valve lift feedback learning correction value stand, the routine proceeds to step 127, where learning of the variable valve lift feedback learning correction value is performed. That is, feedback control of the air-fuel ratio is performed in a state in which the intake air amount is controlled by the valve lift changer 9, and control is performed based on the sensor output during that feedback control so as to make the variable valve lift feedback learning correction value gradually converge to an appropriate value.

Further, at the next step 129, it is judged whether the conditions for ending the learning of the variable valve lift feedback learning correction value stand. The control at this step 129 is basically the same as the control at step 109 of the control routine of FIG. 4. That is, it is judged whether the variable valve lift feedback learning correction value being sought is sufficiently converged. Further, when it is judged at step 129 that the learning end conditions for the variable valve lift feedback learning correction value do not stand, the routine returns to step 127, where learning of the variable valve lift feedback learning correction value is continued. On the other hand, when it is judged at step 129 that the learning end conditions for the variable valve lift feedback learning correction value stand, the routine proceeds to step 131, where the learning of the variable valve lift feedback learning correction value is ended (that is, the variable valve lift feedback learning correction value is determined) and the control routine is ended.

In the above way, in the present embodiment, after determining the feedback learning correction value for when controlling the intake air amount by only the throttle valve 55, the feedback learning correction value for when controlling the intake air amount using the valve lift changer 9 is learned and determined. Further, by doing so, more accurate air-fuel ratio control can be performed when controlling the intake air amount using the valve lift changer 9.

Further, the feedback learning correction value for when controlling the intake air amount using the valve lift changer 9 may be learned and determined for each predetermined control range of the valve lift. By performing the air-fuel ratio control using the plurality of variable valve lift feedback learning correction values obtained in such a way, realization of even more accurate air-fuel ratio control when controlling the intake air amount using the valve lift changer 9 becomes possible.

Figure 7:
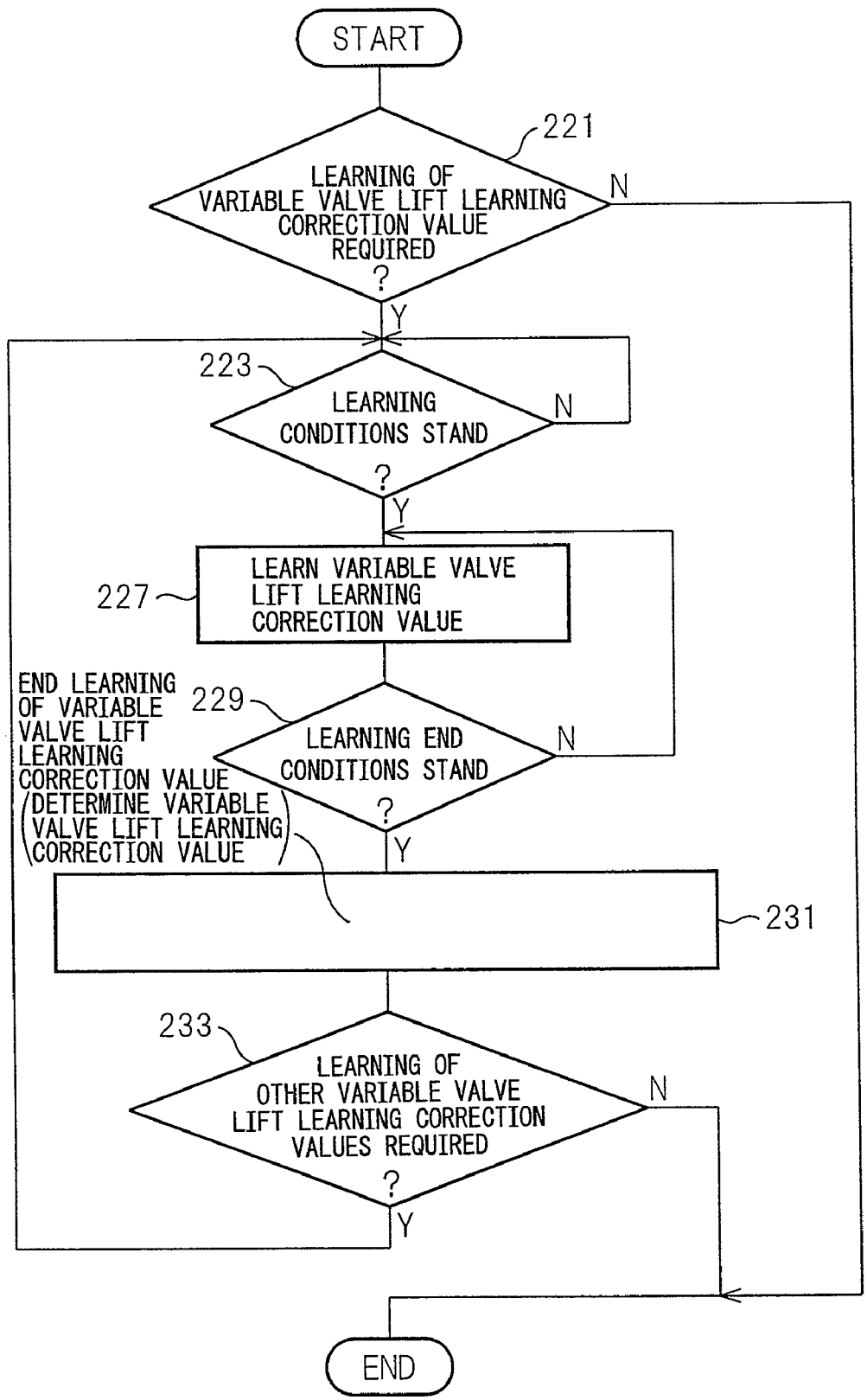
FIG. 7 is a flow chart for explaining control performed in relation to learning and determination of a feedback learning correction value in still another embodiment of the present invention.

Note that, while clear from the above explanation, the control routine shown in the flow chart of FIG. 6 is repeatedly performed at, for example, constant intervals when using a plurality of variable valve lift feedback learning correction values. On the other hand, when using a plurality of variable valve lift feedback learning correction values, control such as the control routine shown in the flow chart of FIG. 7 may be performed. That is, in another embodiment, after, for example, the control of the control routine shown in the flow chart of FIG. 5 is performed and the feedback learning correction value for when controlling the intake air amount by only the throttle valve 55 is determined, the control of the control routine shown in the flow chart of FIG. 7 is performed and the feedback learning correction value for when controlling the intake air amount using the opening characteristic control means constituted by the valve lift changer 9 is learned and performed.

The control of the control routine shown in the flow chart of FIG. 5 was previously explained, so the explanations will be omitted. Below, the control of the control routine shown in the flow chart of FIG. 7 will be explained. That is, referring to FIG. 7, the controls at steps 221, 223, 227, 229, and 231 among the controls at the steps of this control routine respectively correspond to the controls at steps 121, 123, 127, 129, and 131 of the control routine of FIG. 6 explained above. Further, in the control routine of FIG. 7, at step 231, when learning of the variable valve lift feedback learning correction value is ended, the routine proceeds to step 233. Further, at step 233, it is judged whether learning of other variable valve lift feedback learning correction values is necessary. The control here is basically the same as the control at step 213 of the control routine of FIG. 5.

Further, when it is judged at step 233 that learning of other variable valve lift feedback learning correction values is not necessary, the control routine ends. On the other hand, when it is judged at step 233 that learning of other variable valve lift feedback learning correction values is necessary, the routine returns to step 223, where it is judged whether the conditions for learning the variable valve lift feedback learning correction value judged necessary for learning at step 233 stand and subsequent control continues.

Figure 8:
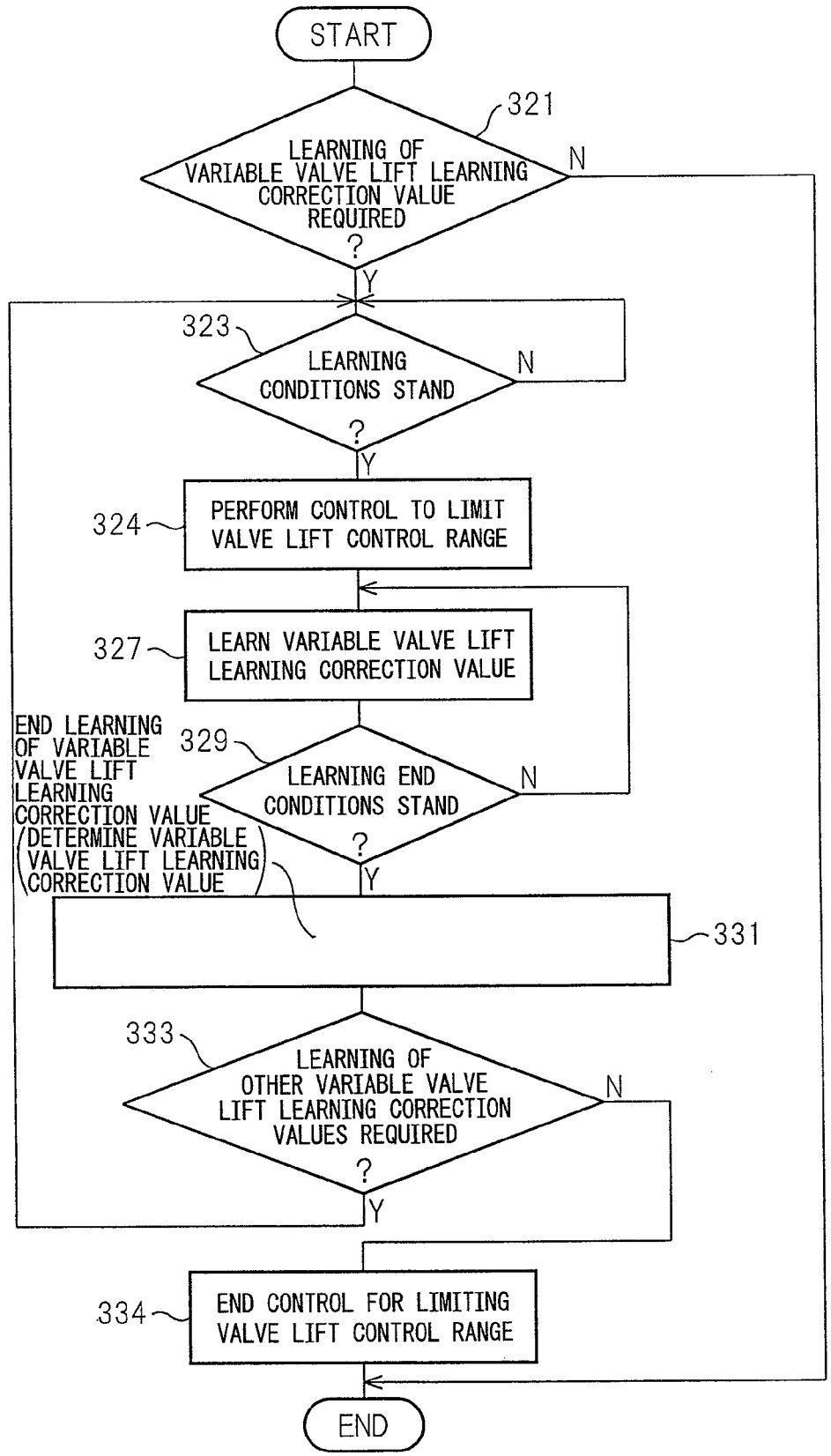
FIG. 8 is a flow chart for explaining control performed in relation to learning and determination of a feedback learning correction value in still another embodiment of the present invention.

Further, when the variable valve lift feedback learning correction value is learned and determined for each predetermined control range of the valve lift, and a plurality of variable valve lift feedback learning correction values are used, control such as in the control routine shown in the flow chart of FIG. 8 may be performed. That is, in still another embodiment, for example, after performing the control of the control routine shown in the flow chart of FIG. 5 and determining the feedback learning correction value when controlling the intake air amount by only the throttle valve 55, the control of the control routine shown in the flow chart of FIG. 8 is performed and the feedback learning correction value for when controlling the intake air amount using the opening characteristic control means constituted by the valve lift changer 9 is learned and determined.

Here, explanations of the control of the control routine shown in the flow chart of FIG. 5 are omitted and the control of the control routine shown in the flow chart of FIG. 8 will be explained. That is, when the control routine shown in the flow chart of FIG. 8 starts, first, at step 321, it is judged whether learning of the variable valve lift feedback learning correction value is necessary. The control at this step 321 is basically the same as the control at step 221 of the control routine of FIG. 7. It is judged whether the variable valve lift feedback learning correction value is stored in the ECU 23 and/or whether the update timing of the variable valve lift feedback learning correction value has arrived, etc.

When it is judged at step 321 that learning of the variable valve lift feedback learning correction value is not necessary, the control routine ends, while when it is judged that learning of the variable valve lift feedback learning correction value is necessary, the routine proceeds to step 323. Further, at step 323, it is judged whether the conditions for performing the learning of the variable valve lift feedback learning correction value stand.

The control at this step 323 is basically the same as the control at step 223 of the control routine of FIG. 7, however, it differs in the point that, at step 323, the control range of the valve lift is not judged. That is, at step 323, there is no judgment of whether the operating state (the control range of the valve lift) at that time is in the control range of the valve lift corresponding to the variable valve lift feedback learning correction value to be learned.

When it is judged at step 323 that the learning conditions for the variable valve lift feedback learning correction value do not stand, the control of step 323 is repeated once again. That is, in this case, the routine waits until the learning conditions of the variable valve lift feedback learning correction value stand.

Figure 9:
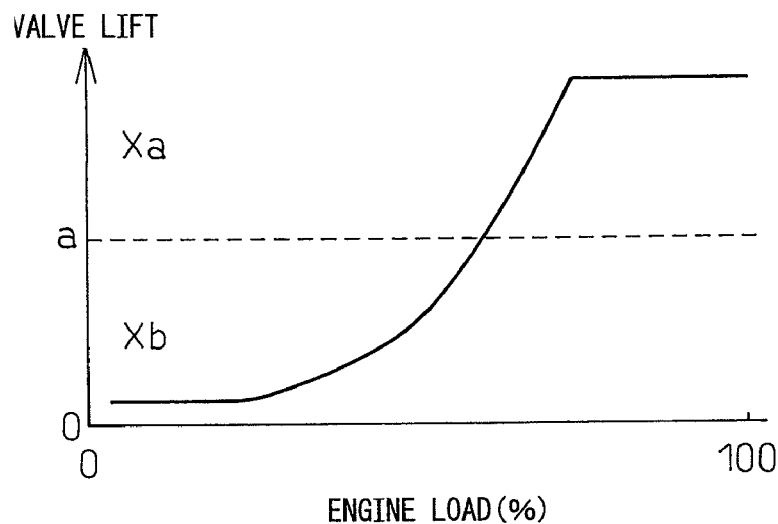
FIG. 9 is a view for explaining a control range predetermined for a valve lift.

On the other hand, when it is judged at step 323 that the learning conditions for the variable valve lift feedback learning correction value stand, the routine proceeds to step 324, where control for limiting the valve lift control range is performed. That is, in the present embodiment, for the control range of the valve lift, the control ranges Xa and Xb such as shown in FIG. 9 are predetermined. Here, the control range Xa is a control range in which the valve lift is a or more, while the control range Xb is a control range in which the valve lift is less than a. Further, when control for limiting the valve lift control range is performed, the control range of the valve lift is limited to the control range of the valve lift corresponding to the variable valve lift feedback learning correction value to be learned.

Note that, in the present embodiment, when a variable valve lift feedback learning correction value corresponding to either the control range Xa or Xb have not been obtained, first, the control range of the valve lift is limited to the control range Xa having a large valve lift value. That is, in the present embodiment, the variable valve lift feedback learning correction value of the control range having a large valve lift value is learned and determined first.

Further, when the routine proceeds to step 324 once again in a state where the control for limiting the valve lift control range is already performed, the limited control range is changed to the side having a smaller valve lift value and the variable valve lift feedback learning correction value in that control range of the valve lift is learned and determined.

When the control for limiting the valve lift control range is performed at step 324, the routine proceeds to step 327, where learning of the variable valve lift feedback learning correction value is performed. The control at step 327 is basically the same as the control at step 227 of the control routine of FIG. 7. Further, in the following steps 329, 331, and 333, respectively basically the same controls as the controls at steps 229, 231, and 233 of the control routine of FIG. 7 are performed.

Further, in the control routine, when it is judged at step 333 that learning of other variable valve lift feedback learning correction values is not necessary, the routine proceeds to step 334, where the control for limiting the valve lift control range ends and the control routine is ended. On the other hand, when it is judged at step 333 that learning of other variable valve lift feedback learning correction values is necessary, the routine returns to step 323, from which control is continued.

As explained above, in the present embodiment, when newly learning and determining the feedback learning correction value for when controlling the intake air using the valve lift changer 9, the control range of the valve lift is limited to the control range Xa of the predetermined control ranges, in which the value of the valve lift becomes large, and the feedback learning correction value corresponding to that control range Xa is learned and determined first.

By doing so, when learning and determining the feedback learning correction value for when controlling the intake air amount using the valve lift changer 9, it is possible to quickly and reliably obtain feedback learning correction values in a control range where the value of the valve lift becomes large, for which correction values error due to variations in the intake air amount among the cylinders (that is, variations in the air-fuel ratio among the cylinders due to that variations in the intake air amount) is small and for which correction values there is little opportunity for learning. Further, by using these feedback learning correction values, more accurate air-fuel ratio control can be performed.

Figure 10:
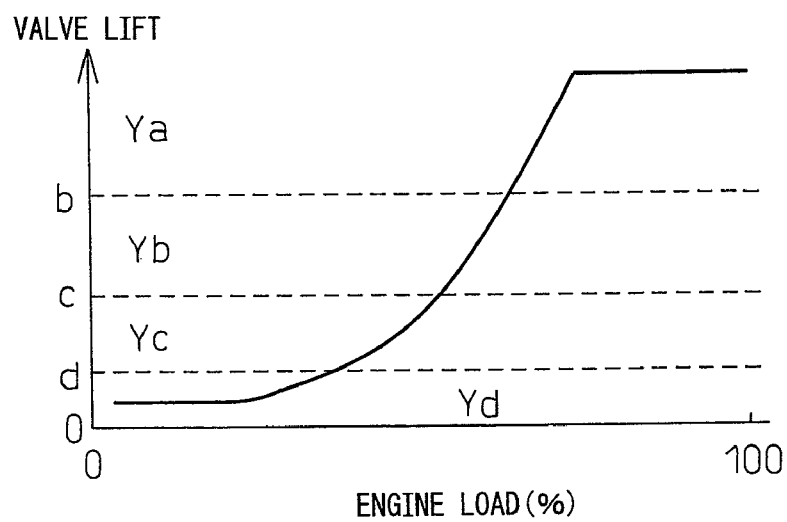
FIG. 10 is another view for explaining a control range predetermined for a valve lift.

Note that, when learning and determining the variable valve lift feedback learning correction value for each predetermined control range of the valve lift, three or more of the predetermined control ranges may be set. That is, for example, in another embodiment, for the control ranges of the valve lift, the control ranges Ya, Yb, Yc, and Yd such as shown in FIG. 10 may be predetermined. Here, the control range Ya is a control range in which the valve lift is b or more, the control range Yb is a control range in which the valve lift is c or more and less than b, the control range Yc is a control range in which the valve lift is d or more and less than c, and the control range Yd is a control range in which the valve lift is less than d.

Further, in this case, when newly learning and determining the feedback learning correction value for when controlling the intake air amount using the valve lift changer 9, it is also possible that, first, the control range of the valve lift is limited to the control range in the predetermined control range in which the valve lift value becomes the largest and the feedback learning correction value corresponding to that control range is learned and determined first.

Further, in the example shown in FIG. 10, the predetermined control ranges are set narrower at the side in which the valve lift becomes a small value. As explained above, the more the control range of the valve lift lies to the side in which the valve lift becomes a small value, the more effect the change in the valve lift has on the intake air amount and, further, the easier variations in the intake air amount among the cylinders (that is, variations in the air-fuel ratio among the cylinders due to that variations in the intake air amount) occur, so by the above, accurate air-fuel ratio control can be performed even when the valve lift is controlled to a relatively small value.

Note that the combination of the controls for when the feedback learning correction value is learned and determined when controlling the intake air amount using the opening characteristic control means constituted by the valve lift changer 9 after determining the feedback learning correction value for when controlling the intake air amount by only the throttle valve 55 is not limited to the above. That is, for example, in another embodiment, after performing the control of the control routine shown in the flow chart of FIG. 4 and determining the feedback learning correction value for when controlling the intake air amount by only the throttle valve 55, the control of the control routine shown in the flow chart of FIG. 7 or FIG. 8 may be performed and the feedback learning correction value for when controlling the intake air amount using the opening characteristic control means constituted by the valve lift changer 9 may be learned and determined, or after performing the control of the control routine shown in the flow chart of FIG. 5 and determining the feedback learning correction value for when controlling the intake air amount by only the throttle valve 55, the control of the control routine shown in the flow chart of FIG. 6 may be performed and the feedback learning correction value for when controlling the intake air amount using the opening characteristic control means constituted by the valve lift changer 9 may be learned and determined.

Further, in another embodiment, it is also possible not to learn the feedback learning correction value for when controlling the intake air amount by only the throttle valve 55 and to just learn and determine the feedback learning correction value for when controlling the intake air amount using the valve lift changer 9. That is, this case is a case where only the variable valve lift learning correction value is used in the air-fuel ratio control. For example, control for learning and determining the feedback learning correction value for when controlling the intake air amount by only the throttle valve 55 as explained above is not performed; only the control of the control routine shown in the flow chart of FIG. 8 is performed and the feedback learning correction value for when controlling the intake air amount using the valve lift changer 9 is learned and determined. Further, even by doing so, more accurate air-fuel ratio control can be performed when performing feedback learning control of the air-fuel ratio in a multi-cylinder internal combustion engine provided with, as a means for controlling the intake air amount, a throttle valve 55 and a valve lift changer 9.

Further, regardless of whether the feedback learning correction value for when controlling the intake air amount by only the throttle valve 55 is learned or not, that is, regardless of whether the learning correction value for when the valve lift is variable is only used in the air-fuel ratio control or the learning correction value for when the valve lift is fixed and the learning correction value for when the valve lift is variable are both used, when learning and determining the feedback learning correction value for when controlling the intake air amount using the valve lift changer 9, it is also possible to newly learn and determine the feedback learning correction value only when the valve lift is of a predetermined value or more. Note that, here, case of controlling the intake air amount using the valve lift changer 9 includes the case of controlling the intake air amount using only the valve lift changer 9 and also the case of controlling the intake air amount by coordinated control of the throttle valve 55 and the valve lift changer 9.

More specifically, in this case, for example, in the control routine shown in the flow chart of FIG. 6, the learning conditions to be judged as standing or not at step 123 include whether or not the valve lift is a predetermined value or more. Further, when newly learning and determining the feedback learning correction value, the control range of the valve lift may be limited to a control range in which the valve lift value is a predetermined value or more. That is, when newly learning and determining the feedback learning correction value, control for limiting the control range of the valve lift which limits the control range so that the valve lift becomes a predetermined value or more is performed. Note that, here, the "predetermined value" is the same as the one explained the previous embodiments and is predetermined taking into consideration, for example, the effects on the intake air amount from the difference in the valve lift (that is, for example, it is made a value in which the effect of the difference in the valve lift on the intake air amount becomes sufficiently low).

Further, by doing so, the valve lift when newly learning and determining the feedback learning correction value will become a relatively large value, so variations in the air-fuel ratio among the cylinders when newly learning and determining the feedback learning correction values can be reliably suppressed. As a result, accurate learning in the learning control can be more reliably performed (that is, the feedback learning correction value can be suitably determined more reliably) and accurate air-fuel ratio control can be more reliably performed.

Note that, as clear from the explanations until now, regardless of the valve lift being fixed or the valve lift being variable, by newly learning and determining the feedback learning correction value only when the valve lift is a predetermined value or more, variations in the air-fuel ratio among the cylinders when newly learning and determining feedback learning correction values can be suppressed. Further, as a result, accurate learning in the learning control can be performed more reliably (that is, accurate determination of the feedback learning correction value can be performed more reliably), and accurate air-fuel ratio control can be performed more reliably.

Further, in the embodiments explained above, control such as the one shown in the control routine of the flow chart of FIG. 11 may be performed for judging the control range of the valve lift. Here, the control routine of the flow chart of FIG. 11 is an example of when the control ranges Xa and Xb such as shown in FIG. 9 are predetermined for the control ranges of the valve lift. Further, this control routine is repeatedly performed at each constant interval.

When the control routine shown in the flow chart of FIG. 11 is started, first, at step 401, the valve lift at that time is read. When the valve lift is read at step 401, the routine proceeds to step 403, where it is judged whether or not the valve lift read at step 401 is the predetermined valve lift a or more. Here, the valve lift a is a lower limit of the control range Xa.

When it is judged at step 403 that the valve lift read at step 401 is the predetermined valve lift a or more, the routine proceeds to step 405, where an Xa side timer is incremented, then proceeds to step 407, where an Xb side timer is cleared. On the other hand, when it is judged at step 403 that the valve lift read at step 401 is not the predetermined valve lift a or more (that is, is less than the valve lift a), the routine proceeds to step 409, where the Xb side timer is incremented, then proceeds to step 411, where the Xa side timer is cleared.

After step 407 or step 411, the routine proceeds to step 413. At step 413, it is judged whether the value of the Xa side timer is less than a predetermined reference value R. When it is judged at step 413 that the value of the Xa side timer is not less than the predetermined reference value R (that is, is the reference value R or more), the routine proceeds to step 415, where the valve lift is judged to be in the control range Xa and the control routine is ended.

On the other hand, when it is judged at step 413 that the value of the Xa side timer is less than the predetermined reference value R, the routine proceeds to step 417. At step 417, it is judged whether or not the value of the Xb side timer is the predetermined reference value R or more. Further, when it is judged at step 417 that the value of the Xb side timer is the predetermined reference value R or more, the routine proceeds to step 419, where it is judged that the valve lift is in the control range Xb and the control routine is ended. On the other hand, when it is judged at step 417 that the value of the Xb side timer is not the predetermined reference value R or more (that is, is less than the reference value R), judgment of the control range is not performed and the control routine ends.

Further, if starting learning of the variable valve lift feedback learning correction value after performing the control shown in the control routine of the flow chart of FIG. 11 and judging the control range of the valve lift, the learning is begun after a state where the valve lift is only in one of the control ranges (that is, the control range Xa or Xb) continues for a certain interval shown by the reference value R. Therefore, by appropriately setting the reference value R, it is possible to perform the learning of the variable valve lift feedback learning correction value in a stable operating state.

Note that, above, the case where main feedback learning control and sub feedback learning control are performed as feedback learning control of the air-fuel ratio was explained as an example, however, the present invention is not limited to this and may also be applied to cases when feedback learning control of the air-fuel ratio is performed by other methods (for example, when only the main feedback learning control is performed).

Further, in the above embodiments, the valve lift changer 9 was provided only on the intake valve 2, however, in other embodiments, the valve lift changer may be provided on the exhaust valve 3 or on both the intake valve 2 and the exhaust valve 3. Further, in the above embodiments, the opening characteristics of the working angle and the valve lift were in a constant relationship, however, in other embodiments, the working angle and the valve lift may be both changed independently, or only the working angle or only the valve lift may be changed.

Note that, the present invention was explained in detail based on particular embodiments, but a person skilled in the art could make changes, revisions, etc. without deviating from the claims and concept of the present invention.

The invention claimed is:

1. An air-fuel ratio control system of a multi-cylinder internal combustion engine provided with, as an intake air amount control means, a throttle valve and an opening characteristic control means for controlling at least one of a working angle and a valve lift of at least one of an intake valve and an exhaust valve, wherein said system controls a fuel injection amount based on an output of at least one of a sensor detecting an air-fuel ratio of exhaust gas flowing through an exhaust passage and a sensor detecting an oxygen concentration of exhaust gas flowing through the exhaust passage so as to perform air-fuel ratio feedback control, wherein said air-fuel ratio feedback control includes learning control which is performed by correcting a relationship of the output of said sensor and a feedback value based on a feedback learning correction value which is learned and determined based on the output of said sensor during said air-fuel ratio feedback control and, when the intake air amount is controlled by only said throttle valve when newly learning and determining said feedback learning correction value, while at least one of said working angle and said valve lift is made a constant value of at least a predetermined value.

2. An air-fuel ratio control system of a multi-cylinder internal combustion engine as set forth in claim 1, wherein after determining said feedback learning correction value for when controlling said intake air amount by only said throttle valve, a feedback learning correction value for when controlling said intake air amount using said opening characteristic control means is learned and determined.

3. An air-fuel ratio control system of a multi-cylinder internal combustion engine as set forth in claim 2, wherein the feedback learning correction value for when controlling said intake air amount using said opening characteristic control means is learned and determined for each predetermined control range of said working angle and/or valve lift.

4. An air-fuel ratio control system of a multi-cylinder internal combustion engine as set forth in claim 3, wherein when newly learning and determining the feedback learning correction value for when controlling said intake air amount using said opening characteristic control means, the control range of said working angle and/or valve lift is limited to a control range in said predetermined control range in which the value of said working angle and/or valve lift becomes the largest and said feedback learning correction value corresponding to that control range is first learned and determined.

5. An air-fuel ratio control system of a multi-cylinder internal combustion engine as set forth in claim 3, wherein said predetermined control range is set narrower at a side where said working angle and/or valve lift become small values.

6. An air-fuel ratio control system of a multi-cylinder internal combustion engine as set forth in claim 1, wherein an exhaust purifying means is provided in the exhaust passage, one of a sensor detecting an air-fuel ratio of exhaust gas and a sensor detecting an oxygen concentration of exhaust gas, is provided further upstream from the exhaust purifying means as an upstream side sensor, one of a sensor detecting an air-fuel ratio of exhaust gas and a sensor detecting an oxygen concentration of exhaust gas, is provided further downstream from said exhaust purifying means as a downstream side sensor, and said air-fuel ratio feedback control includes at least one of a main feedback control performed based on an output of said upstream side sensor and a sub feedback control performed based on an output of said downstream side sensor.

* * * * *